United States Patent
Guenther et al.

(10) Patent No.: US 11,914,168 B2
(45) Date of Patent: Feb. 27, 2024

(54) DIRECT GLUE COMPACT TWO DIMENSIONAL FIBER LAUNCHER ASSEMBLY

(71) Applicant: NORTHROP GRUMMAN SYSTEMS CORPORATION, Falls Church, VA (US)

(72) Inventors: Dustin Guenther, La Mirada, CA (US); Gregory D. Goodno, Los Angeles, CA (US); James Ho, Los Angeles, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 60 days.

(21) Appl. No.: 17/647,775

(22) Filed: Jan. 12, 2022

(65) Prior Publication Data
US 2023/0221573 A1 Jul. 13, 2023

(51) Int. Cl.
*G02B 27/62* (2006.01)
*G02B 6/26* (2006.01)
*G02B 27/10* (2006.01)

(52) U.S. Cl.
CPC ............. *G02B 27/62* (2013.01); *G02B 6/262* (2013.01); *G02B 27/106* (2013.01)

(58) Field of Classification Search
CPC ........ G02B 6/262; G02B 6/32; G02B 6/4206; G02B 27/62; G02B 27/12; G02B 27/106; H01S 3/2383; F41H 13/005
See application file for complete search history.

(56) References Cited

U.S. PATENT DOCUMENTS

| | | | |
|---|---|---|---|
| 6,419,405 B1 | 7/2002 | Boscha | |
| 10,267,992 B1 | 4/2019 | Goodno et al. | |
| 2005/0111796 A1* | 5/2005 | Matasek | G02B 6/4277 385/55 |
| 2008/0131052 A1* | 6/2008 | Matsumura | G02B 3/0087 385/33 |
| 2016/0282562 A1* | 9/2016 | Takamizawa | G02B 6/02052 |
| 2018/0140170 A1* | 5/2018 | Van Putten | G02B 6/32 |

FOREIGN PATENT DOCUMENTS

EP 1413905 A1 4/2004

OTHER PUBLICATIONS

U.S. Appl. No. 17/004,065, filed Aug. 27, 2020.

\* cited by examiner

*Primary Examiner* — Michael P Mooney
(74) *Attorney, Agent, or Firm* — John A. Miller; Shumaker, Loop & Kendrick, LLP

(57) ABSTRACT

A method for assembling a two-dimensional fiber array launcher assembly. The method includes providing an alignment structure having a two-dimensional alignment plate with holes at one end and a two-dimensional beam shaper with micro-lenses at an opposite end. An endcap having a fiber attached thereto is systematically positioned in each hole, and is aligned with one of the micro-lenses with a high precision tolerance. The aligned endcap is then secured in the hole using a curable glue. This process is continued until all of the holes have aligned endcaps. If one of the endcaps is mis-aligned or becomes damaged, the glue can be heated and the endcap realigned or replaced.

18 Claims, 3 Drawing Sheets

DIRECT GLUE COMPACT TWO DIMENSIONAL FIBER LAUNCHER ASSEMBLY

BACKGROUND

Field

This disclosure relates generally to a method for assembling a two-dimensional fiber array launcher assembly and, more particularly, to a method for assembling a two-dimensional fiber array launcher assembly that includes providing an alignment structure having a two-dimensional alignment plate with holes at one end and a two-dimensional beam shaper with micro-lenses at an opposite end, systematically positioning an endcap having a fiber attached thereto in each hole, aligning the fiber with one of the micro-lenses with a high precision tolerance, and securing the endcap in the hole using a curable glue.

Discussion

Directed energy (DE) systems that direct a high energy optical beam to a target are rapidly being realized in real-world operational environments. Reliable, robust and efficient beam delivery of individual multi-kW class lasers and high energy and peak power pulsed illuminators to remote beam directors and combiners are key driving elements for DE systems. Fiber laser amplifiers have proven to be desirable as energy sources for DE systems because of their high efficiency, high power scalability and excellent beam quality. Fiber laser systems employ multiple fiber laser amplifiers that combine the amplified beams in some fashion to generate higher powers. A design challenge for fiber laser amplifier systems of this type is to combine the beams from a plurality of fiber amplifiers in a manner so that the beams provide a single beam output having a uniform phase over the beam diameter such that the beam can be focused to a small focal spot, where focusing the combined beam to a small spot at a long distance (far-field) defines the quality of the beam.

There are two general approaches for scaling beam combiner systems to higher powers. One approach is known as spectral beam combining (SBC), where multiple lasers of different wavelengths are combined on a diffraction grating or other dispersive optic into a single beam. The other approach is known as coherent beam combining (CBC), where multiple mutually coherent lasers are locked in phase with one another and combined into a single beam either by overlapping in the near field using a beam splitter, or by tiling side by side to form a composite beam, a configuration that is colloquially referred to as a "phased array".

The current state of the art for CBC and SBC typically employs one-dimensional beam combining. However, two-dimensional high power coherent beam combining is a significant improvement over one-dimensional spectral beam combining because it allows for a more compact, higher power beam combining system, thus enabling scale up to megawatt capacity. Due to the nature of coherent beam combining, the performance of the final combined beam is significantly dependent on the placement of the beams in the two-dimensional space. This leads to a requirement to be able to align and fix many (10's to 100's) of beam channels in a two-dimensional space to be within 1 kW of output power. With such high optical power the fiber to air interface is likely to reach the damage power threshold of the fiber glass. The industry standard way of dealing with this is to attach a coreless endcap to the fiber that allows for the expansion of the optical beam leading to a reduction of optical power density at the air interface.

Further, because these types of beam combining systems will likely scale to 100's of fibers to reach megawatt class outputs, there is a need to be able to replace individual fiber channels. Particularly, if a fiber channel is mis-aligned during installation or becomes damaged during operation, the performance of the system is improved by the ability to replace and correct a channel. Several designs have been used in the art and include replaceable individual units, stacked arrays and direct Co2 laser weld to glass surfaces. However, all of these designs have not demonstrated sub-micron alignment tolerances, most are susceptible to stack up errors across multiple sub-component builds, and only a robust electric laser initiative (RELI) type unit is capable of sub-unit replacement at the cost of large component-to-component pitch, which increases the total size of the system, and is an expensive, complicated assemblies. Therefore, a two-dimensional beam combining architecture is needed that provides a better solution.

DETAILED DESCRIPTION OF THE EMBODIMENTS

The following discussion of the embodiments of the disclosure directed to a method for assembling a two-dimensional fiber array launcher assembly is merely exemplary in nature, and is in no way intended to limit the disclosure or its applications or uses. For example, the fiber array launcher assembly has particular application as a beam emitter in a CBC fiber laser amplifier system. However, as will be appreciated by those skilled in the art, the fiber array launcher assembly may have application for other optical systems.

Figure 1:
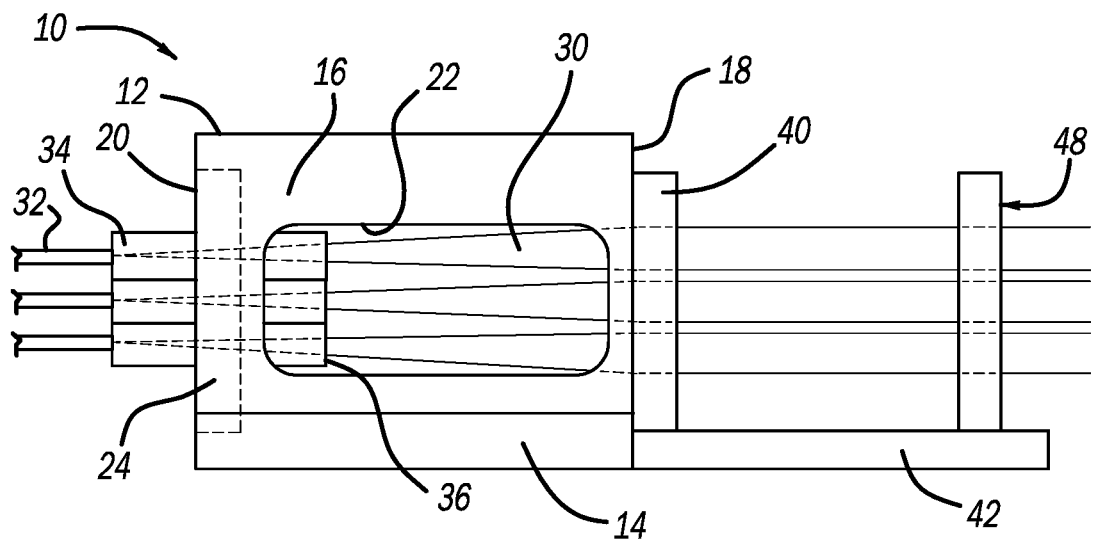
FIG. 1 is a side view of a two-dimensional fiber array launcher assembly.
Figure 2:
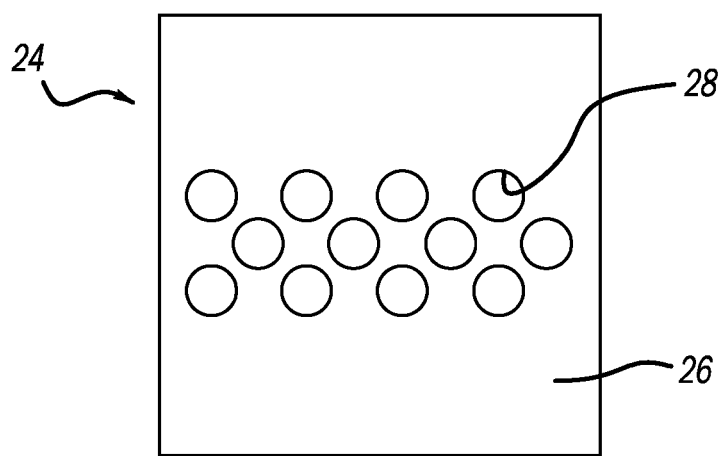
FIG. 2 is a front view of a two-dimensional endcap alignment plate separated from the fiber array launcher assembly.

FIG. 1 is a side view of a two-dimensional fiber array launcher assembly 10 including an alignment structure 12 having a support base 14 and a hollow body 16 with a front end 18, a rear end 20 and an opening 22 therebetween. In one embodiment, the alignment structure 12 is made of invar so that it has a low coefficient of thermal expansion. An alignment plate 24 is mounted in the back end 20 of the body 16 and includes a glass substrate 26 having a two-dimensional array of holes 28 extending therethrough. FIG. 2 is a front view of the plate 24 separated from the assembly 10. The configuration of the holes 28 is shown merely as an example in that any configuration and number of the holes 28 suitable for the purposes discussed herein can be employed. The alignment plate 24 can be cut using CNC machines to allow for a few micron class tolerances in spacing and hole dimensions. The size of the holes 28 is carefully chosen to allow for build errors and room for alignment. A clearance diameter between the holes 28 on the order of 50-100 microns may be a good balance between these two needs.

A number of optical fibers 32 provide amplified optical beams 30 to the launcher assembly 10. For certain high energy applications, that number may be in the hundreds of fibers. An end of each fiber 32 is spliced, i.e., cleaved, and secured to an end of an optical or glass cylindrical endcap 34 by, for example, fusion splicing, where an anti-reflective coating 36 is formed on an opposite end of the endcap 34 and an angled face on the endcap 34 is provided to reduce back reflection. The glass for the endcap 34 must be exceptionally high purity to reduce absorption. The diameter of the endcaps 34 is larger than the diameter of the fibers 32 and slightly smaller than the diameter of the holes 28. The endcap 34 protects the end of the fiber 32 against the high power density of the beam 30 because the larger diameter endcap 34 allows the beam 30 to expand as it propagates through the endcap 34. Each endcap 34 is extended through one of the holes 28 and secured thereto by, for example, a suitable glue as will be discussed in further detail below.

Figure 3:
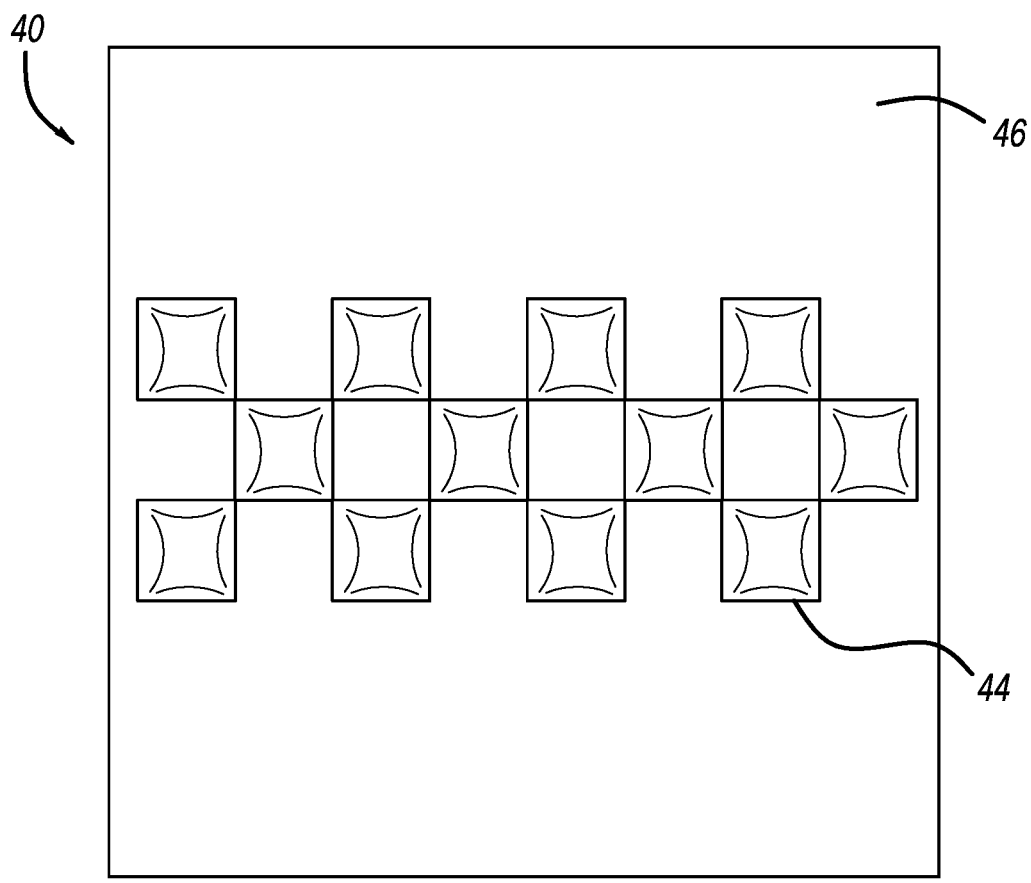
FIG. 3 is a front view of a two-dimensional monolithic beam shaper separated from the fiber array launcher assembly.

A monolithic glass beam shaper 40 is provided on a base plate 42 that is attached to the support base 14, where the beam shaper 40 is face bonded to the front end 18 of the body 16 by, for example, a suitable glue, and is open to the hollow interior of the body 16 so there are no strict tolerance requirements on the X/Y structural dimensions. The beam shaper 40 includes a two-dimensional array of micro-lenses 44 formed in an optical glass plate 46 and positioned so that each micro-lens 44 aligns with one of the end caps 34. FIG. 3 is a front view of the beam shaper 40 separated from the assembly 10. The beam shaper 40 can be built using laser ablation machining that can shape the surface of glass in an arbitrary manner. This can be done with a high level of accuracy, but often has errors on the order of a few microns in placement. The Z direction alignment is determined by setting the endcap 34 at the right depth, so there are minimal tolerance requirements on that dimension as well. Given these components, there are multiple few micron errors that when stacked up would far exceed the needed requirement. However, there is only one critical alignment step during the entire assembly, which is the position of the endcap 34 in the hole 28.

The beam 30 emitted from each fiber 32 propagates through and out of the endcap 34 and expands in free space through the hollow body 16. Because of the defined length of the body 16 and the size and position of the micro-lenses 44, the expanding beam 30 will fill the entire micro-lens 44 and be collimated by the micro-lens 44. An optional beam shaper correction plate 48 can be provided on the base 42 a predefined distance from the beam shaper 40 and also includes micro-lenses aligned with each of the micro-lenses 44, where the correction plate 48 provides beam corrections for beam alignment and fabrication errors.

Figure 4:
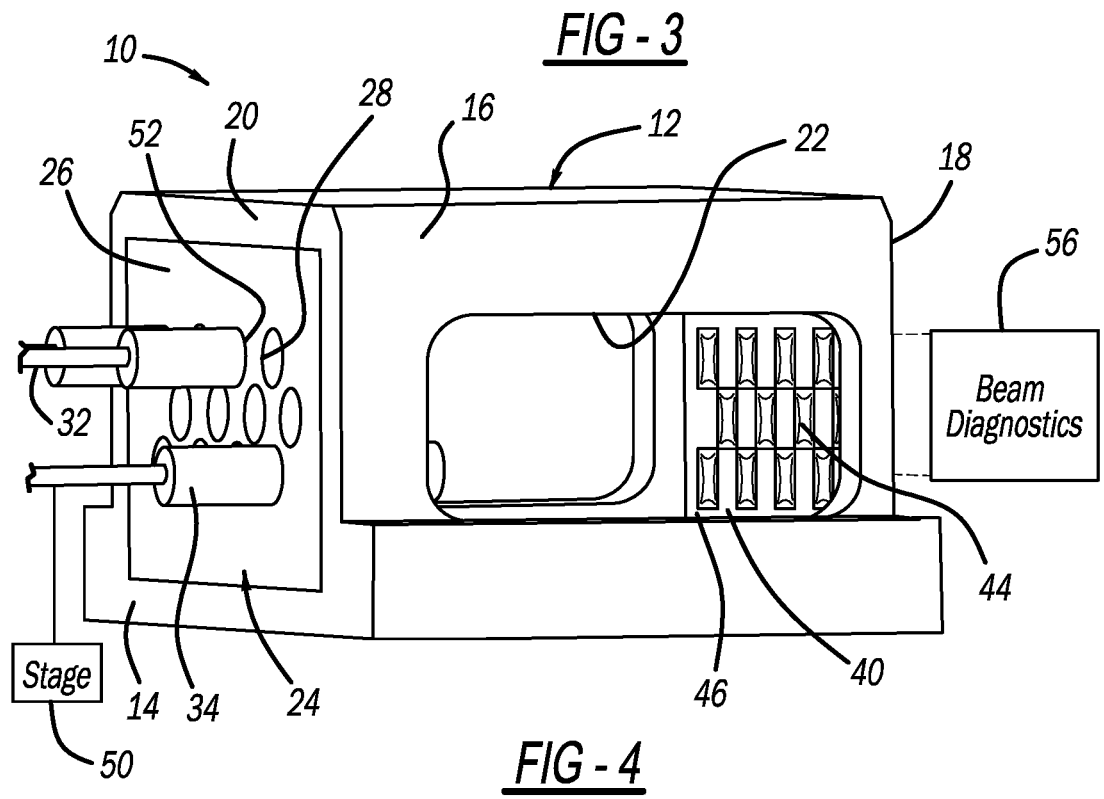
FIG. 4 is an isometric view of the fiber array launcher assembly in a state of assembly in combination with beam diagnostics.

FIG. 4 is an isometric view of the fiber array launcher assembly 10 in a state of assembly. When dealing with very tight tolerances, it is important to reduce stack-up errors and reduce the necessity for very high precision and high cost machining. The assembly process for the fiber array launcher assembly 10 allows low cost and low precision parts to provide high precision part alignment by individually aligning the endcaps 34 to the beam shaper 40 using, for example, high precision beam diagnostics 56. The glass alignment plate 24 and the beam shaper 40 are installed at the ends 20 and 18, respectively, of the body 16 in relatively low tolerance alignment with each other. This step can be done using passive mechanical alignment or the beam shaper 40 can be actively aligned to pre-installed endcaps. The endcaps 34 are attached to the fibers 32 using standard optical equipment. Specifically, the fibers 32 are cleaved and then spliced to the endcaps 34. Each endcap 34 is then inserted into its respective hole 28 in the plate 24 and then moved around in the hole 28 using any suitable device 50, such as a five-axis high precision stage, in coordination with high precision beam diagnostics 56 until it is in a high tolerance precision alignment with the micro-lens 44 in the beam shaper 40 to obtain sub-micron tolerances. The endcap 34 is held in the respective hole 28 in the high precision alignment and a suitable heated glue 52, such as a UV curable epoxy or a low viscosity glue, is placed in the hole 28 so that it flows around the endcap 34. The glue 52 is cured and hardened so that the endcap 34 is held in the desired alignment when released by the device 50. Laser welding can also be employed to secure the endcaps 34 to the plate 24. Each endcap 34 is systematically and individually secured to the plate 24 in this manner. If an installed endcap 34 is misaligned or a fiber 32 or endcap 34 is damaged, the glue 52 can be reheated using, for example, a soldering iron or laser source, and the endcap 34 can be realigned or replaced.

Figure 5:
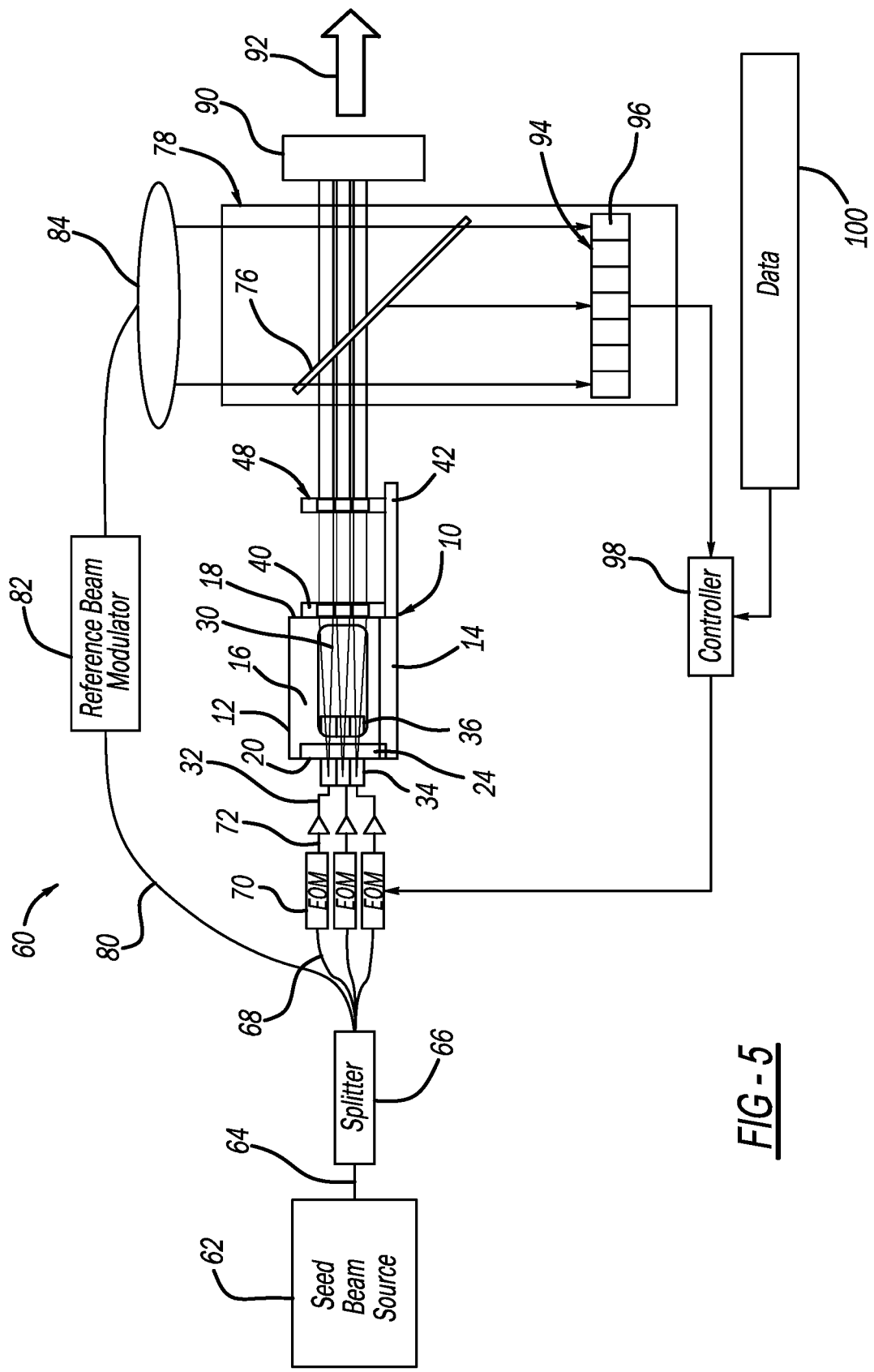
FIG. 5 is a schematic block diagram of a CBC fiber laser amplifier system that includes the fiber array launcher assembly.

FIG. 5 is a schematic block diagram of a CBC fiber laser amplifier system 60 that employs the fiber array launcher assembly 10. The system 60 includes a seed beam source 62 that generates a continuous wave frequency-modulated seed beam having a center wavelength on a fiber 64. The source 62 may include a master oscillator (MO), such as a single-longitudinal mode distributed feedback (DFB) diode laser oscillator, and a frequency modulator, such as an electro-optical modulator (EOM). The EOM may receive an applied voltage provided by an amplified radio frequency (RF) electrical drive signal from an RF source (not shown) that provides frequency modulation broadening, such as white noise or pseudo-random bit sequence (PRBS), so that the modulated seed beam has a linewidth that is substantially broadened, which suppresses stimulated Brillouin scattering in a downstream high power fiber amplifier. The modulated seed beam on the fiber 64 is split by an optical splitter 66 to produce a plurality of split seed beams on fibers 68 having the same wavelength λ, where each split seed beam is sent to a separate EOM 70 that provides servo-phase control of the seed beams for phase-locking purposes.

Each of the modulated seed beams is provided on a fiber 72 and sent to a fiber amplifier 74, such as a Yb-doped fiber amplifier, where the amplifier 74 will typically be a doped amplifying portion of the fiber 72 that receives an optical pump beam (not shown) to generate the amplified beams 30. The amplified beams 30 are directed onto the fibers 32 and sent through the fiber array launcher assembly 10 that operates as a beam emitter. The emitted amplified beams 30 from the fiber array launcher assembly 10 are directed as a combined amplified beam through a beam splitter 76 in a phase sensing assembly 78 that samples off a sample portion of each of the separate beams in the combined beam. The optical splitter 66 is configured to also generate a reference beam 80 that is sent to a reference beam modulator 82 that modulates the reference beam 80. The reference beam modulator 82 could include, for example, an acousto-optic modulator that shifts the center frequency of the reference beam 80, or an EOM that imparts a digital phase shift to the reference beam 80. The modulated reference beam 80 is expanded by a beam expander 84 to provide a flat wavefront and to overlap with the combined amplified beam on the beam splitter 76. The intensities of the overlapped reference and sample beams are detected by an array 94 of photodetectors 96. The main part of the combined amplified beam is sent to a beam director telescope 90 that directs an output beam 92 to a target (not shown).

The electrical signals from the photodetectors 96 are used by a phase locking controller 98 to control the EOMs 70 to correct the phase of the seed beams, using, for example, a phase-locking technique, such as optical heterodyne detection (OHD), well known to those skilled in the art. However, other phase-locking techniques (not shown) can be employed that may not require a frequency shifted reference beam, or instead using a far-field generating lens that focuses the entire beam array onto a single detector, where error signals for each channel are extracted electrically using a variety of multi-dither approaches, such as, for example, a stochastic parallel gradient decent (SPGD) algorithm, well known to those skilled in the art. The controller 98 may receive other data and information provided at box 100 to determine the phase set-points, such as wavefront aberration data or beam steering set-points. More particularly, the controller 98 provides error signals of the phase difference between the sampled beams, and provides those error signals to the EOMs 70 to control the phases of the individual seed beams so that all of the seed beams are locked in phase. In other words, the EOMs 70 provide seed beam phase control so that a "piston" phase of the combined amplified beam is spatially uniform across the beam wavefront. This also allows the phases of the seed beams to be altered relative to each other for electronic beam steering purposes. The controller 98 can also impart phase control of the beams to correct for measured atmospheric anomalies where the output beam 92 may have wavefront aberrations that are corrected as a result of propagating through the atmospheric aberrations so that the beam 92 is of the desired quality when it impinges the target.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for assembling a two-dimensional fiber array launcher assembly, said method comprising:
   providing a plurality of fiber assemblies each including a fiber having an end face spliced to an end of an endcap where the endcap has a larger diameter than the fiber;
   providing an alignment structure including a hollow body having a front end and a rear end;
   providing an alignment plate including a two-dimensional array of holes;
   providing a beam shaper including a two-dimensional array of lenses where a separate lens is provided for each hole in the alignment plate;
   mounting the alignment plate in the rear end of the alignment structure;
   mounting the beam shaper to the front end of the alignment structure so that one of the lenses is generally aligned with each hole in the alignment plate;
   positioning one of the endcaps in one of the holes in the alignment plate;
   propagating a beam down the fiber that expands through the endcap and the hollow body to be collimated by the respective lens in the beam shaper and be received by a beam diagnostics device;
   adjusting the position of the endcap in the hole until the beam is aligned with the lens to a desired tolerance;
   placing glue in the hole to secure the endcap to the alignment plate in the aligned position; and
   repeating the steps of positioning one of the endcaps in one of the holes, propagating a beam down the fiber, adjusting the position of the endcap in the hole and placing glue in the hole for each hole in the alignment plate.

2. The method according to claim 1 wherein the glue is a UV curable epoxy.

3. The method according to claim 1 wherein the endcaps, the alignment plate and the beam shaper are glass.

4. The method according to claim 1 wherein the alignment structure is metal.

5. The method according to claim 1 wherein the endcaps are cylindrical and the holes are round.

6. The method according to claim 1 further comprising heating the glue in one of the holes to re-align a mis-aligned endcap or replace a damaged endcap.

7. The method according to claim 1 wherein the fiber array launcher assembly is a beam emitter in a coherent beam combining (CBC) fiber laser amplifier system.

8. A method for assembling a two-dimensional fiber array launcher assembly, said method comprising:
   providing a plurality of fiber assemblies each including a fiber having an end face spliced to an end of an endcap where the endcap has a larger diameter than the fiber;
   providing an alignment structure including a hollow body, a two-dimensional glass alignment plate having holes at one end of the body and a two-dimensional beam shaper having micro-lenses at an opposite end of the body;
   positioning an endcap in one of the holes and aligning the associated fiber with one of the micro-lenses;
   gluing the aligned endcap in the hole using a curable glue; and
   repeating positioning an endcap and gluing the aligned endcap until all of the holes have aligned endcaps, wherein the fiber array launcher assembly is a beam emitter in a coherent beam combining (CBC) fiber laser amplifier system.

9. The method according to claim 8 wherein the glue is a UV curable epoxy.

10. The method according to claim 8 wherein the endcaps are cylindrical and the holes are round.

11. The method according to claim 8 further comprising heating the glue in one of the holes to re-align a mis-aligned endcap or replace a damaged endcap.

12. A two-dimensional fiber array launcher assembly, said launcher assembly comprising:
   a hollow body having a front end and a rear end;
   an alignment plate including a two-dimensional array of holes coupled to the rear end of the body;
   a beam shaper including a two-dimensional array of lenses coupled to the front end of the body, wherein a separate lens is aligned with each hole in the alignment plate; and
   a plurality of fiber assemblies each including a fiber having an end face spliced to an end of an endcap where the endcap has a larger diameter than the fiber, wherein a separate endcap is secured in each hole so that the fiber is aligned with the associated lens, and wherein the fiber array launcher assembly is a beam emitter in a coherent beam combining (CBC) fiber laser amplifier system.

13. The launcher assembly according to claim 12 wherein each endcap is secured in the hole with glue.

14. The launcher assembly according to claim 13 wherein the glue is a UV curable epoxy.

15. The launcher assembly according to claim 12 wherein the endcaps, the alignment plate and the beam shaper are glass.

16. The launcher assembly according to claim 12 wherein the body is metal.

17. The launcher assembly according to claim 12 wherein the endcaps are cylindrical and the holes are round.

18. A method for assembling a two-dimensional fiber array launcher assembly, said method comprising:
   providing a plurality of fiber assemblies each including a fiber having an end face spliced to an end of an endcap where the endcap has a larger diameter than the fiber;
   providing an alignment structure including a two-dimensional glass alignment plate having holes at one end and a two-dimensional beam shaper having micro-lenses at an opposite end;
   positioning an endcap in one of the holes and aligning the associated fiber with one of the micro-lenses;
   gluing the aligned endcap in the hole using a curable glue;
   repeating positioning an endcap and gluing the aligned endcap until all of the holes have aligned endcaps; and
   heating the glue in one of the holes to re-align a misaligned endcap or replace a damaged endcap.

* * * * *